(12) United States Patent
Figard et al.

(10) Patent No.: US 10,108,189 B2
(45) Date of Patent: Oct. 23, 2018

(54) INTEGRATED FLIGHT MANAGEMENT SYSTEM AND FLIGHT DIRECTOR

(71) Applicant: GE Aviation Systems LLC, Grand Rapids, MI (US)

(72) Inventors: Michael Eric Figard, Rockford, MI (US); Norman Leonard Ovens, Ada, MI (US); Sharon Ann Green, Clearwater, FL (US); Jennifer Cooper, Walnut Creek, CA (US); So Young Kim, Dublin, CA (US); Mark Lawrence Darnell, Grand Rapids, MI (US); George R. Henderson, Cheltenham (GB)

(73) Assignee: GE Aviation Systems LLC, Grand Rapids, MI (US)

( * ) Notice: Subject to any disclaimer, the term of this patent is extended or adjusted under 35 U.S.C. 154(b) by 110 days.

(21) Appl. No.: 15/223,088

(22) Filed: Jul. 29, 2016

(65) Prior Publication Data

US 2018/0032073 A1    Feb. 1, 2018

(51) Int. Cl.
*G05D 1/00* (2006.01)
*G08G 5/00* (2006.01)
(Continued)

(52) U.S. Cl.
CPC .......... *G05D 1/0061* (2013.01); *B64D 43/00* (2013.01); *G05D 1/0088* (2013.01); *G05D 1/101* (2013.01); *G08G 5/003* (2013.01)

(58) Field of Classification Search
CPC ........ G06F 17/00; G01D 5/00; G05D 1/0061; G05D 1/101; G05D 1/0088; B64D 43/00
See application file for complete search history.

(56) References Cited

U.S. PATENT DOCUMENTS 6,128,553 A    10/2000 Gordon et al.
6,405,124 B1 *  6/2002 Hutton ............... G01C 21/00
                                              701/122

(Continued)

OTHER PUBLICATIONS

Extended European Search Report and Opinion issued in connection with corresponding EP Application No. 17183139.9 dated Nov. 16, 2017.

*Primary Examiner* — Yonel Beaulieu
*Assistant Examiner* — Martin A Weeks
(74) *Attorney, Agent, or Firm* — GE Aviation Systems LLC; William Andes

(57) ABSTRACT

Systems and methods for controlling an aerial vehicle are provided. The method includes receiving a first signal from a first input device, wherein the first signal is related to a mode of a flight director. The method includes outputting a parameter on an output device, wherein the parameter is related to the mode. The method includes receiving a second signal from a second input device, wherein the second signal causes the parameter to change to a new parameter. The method includes outputting, by the one or more processors, the new parameter on the output device. The method includes receiving, by the one or more processors, a third signal from a third input device, wherein the aerial vehicle is controlled by the flight director based on the third signal, and wherein the second input device is mechanically coupled to the first input device and the third input device.

15 Claims, 7 Drawing Sheets

(51) Int. Cl.
    *B64D 43/00*     (2006.01)
    *G05D 1/10*     (2006.01)

(56) References Cited

U.S. PATENT DOCUMENTS

| | | | |
|---|---|---|---|
| 7,321,318 | B2 | 1/2008 | Crane et al. |
| 8,310,446 | B1 | 11/2012 | Owen et al. |
| 8,423,207 | B2 | 4/2013 | Davis et al. |
| 8,694,184 | B1 | 4/2014 | Boorman et al. |
| 8,818,580 | B2 | 8/2014 | Louise-Babando et al. |
| 8,886,372 | B2 | 11/2014 | Nikolic et al. |
| 8,965,601 | B1 | 2/2015 | Barber |
| 9,126,694 | B2 | 9/2015 | Chandrashekarappa et al. |
| 9,132,913 | B1 | 9/2015 | Shapiro et al. |
| 9,199,724 | B2 | 12/2015 | Pastor |
| 9,205,916 | B2 | 12/2015 | Boorman et al. |
| 2004/0162648 | A1* | 8/2004 | Bontrager .............. G01C 23/00 701/3 |
| 2009/0140993 | A1* | 6/2009 | Han ...................... B60W 50/16 345/173 |
| 2012/0280087 | A1 | 11/2012 | Coffman et al. |
| 2013/0013133 | A1 | 1/2013 | Walter |
| 2014/0018980 | A1 | 1/2014 | Bollapragada et al. |
| 2015/0022479 | A1* | 1/2015 | Nikolic ................ G01C 23/005 345/173 |
| 2016/0221667 | A1* | 8/2016 | Bennett .................. B64C 25/20 |
| 2017/0036753 | A1* | 2/2017 | Shue ...................... B64C 13/22 |

\* cited by examiner

US 10,108,189 B2

INTEGRATED FLIGHT MANAGEMENT SYSTEM AND FLIGHT DIRECTOR

FIELD

The present subject matter relates generally to aerial vehicles.

BACKGROUND

One of the largest challenges to safety of flight is pilot automation and flight mode confusion. This is apparent in the systems used to automatically maneuver the aerial vehicle. In current aerial vehicles, the flight management system and the flight director are loosely coupled. Interactions with the flight management system are usually accomplished through a keyboard or cursor interface. Interactions with the flight director are controlled by the mode control panel. The mode control panel also has mechanisms to select which system, the flight management or the flight director, is in charge. The complexity of the current systems provides many opportunities for pilots to misinterpret data presented to them or understanding what the aerial vehicle is about to do. Further, pilots can enter incorrect input into various systems.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for controlling an aerial vehicle. The method includes receiving a first signal from a first input device, wherein the first signal is related to a mode of a flight director. The method includes outputting a parameter on an output device, wherein the parameter is related to the mode. The method includes receiving a second signal from a second input device, wherein the second signal causes the parameter to change to a new parameter, and wherein the second input device is mechanically coupled to the first input device. The method includes outputting, by the one or more processors, the new parameter on the output device. The method includes receiving, by the one or more processors, a third signal from a third input device, wherein the aerial vehicle is controlled by the flight director based on the third signal, and wherein the second input device is mechanically coupled to the third input device.

Another example aspect of the present disclosure is directed to a system for controlling an aerial vehicle. The system includes a flight director that controls the aerial vehicle. The system includes a first input device that specifies one or more modes of the flight director. The system includes a second input device that specifies one or more parameters related to the one or more modes, wherein the second input device is mechanically coupled to the first input device. The system includes a third input device that confirms the one or more parameters, wherein the second input device is mechanically coupled to the third input device. The system includes an output device that displays the one or more parameters. The system includes one or more processors. The one or more processor are configured to transmit a signal to the flight director based on an engagement of the third input device, wherein the signal comprises the one or more parameters based on the second input device, and wherein the signal updates the flight director.

Other example aspects of the present disclosure are directed to systems, methods, aerial vehicles, avionics systems, devices, non-transitory computer-readable media for integrating a flight management system and a flight director of an aerial vehicle. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
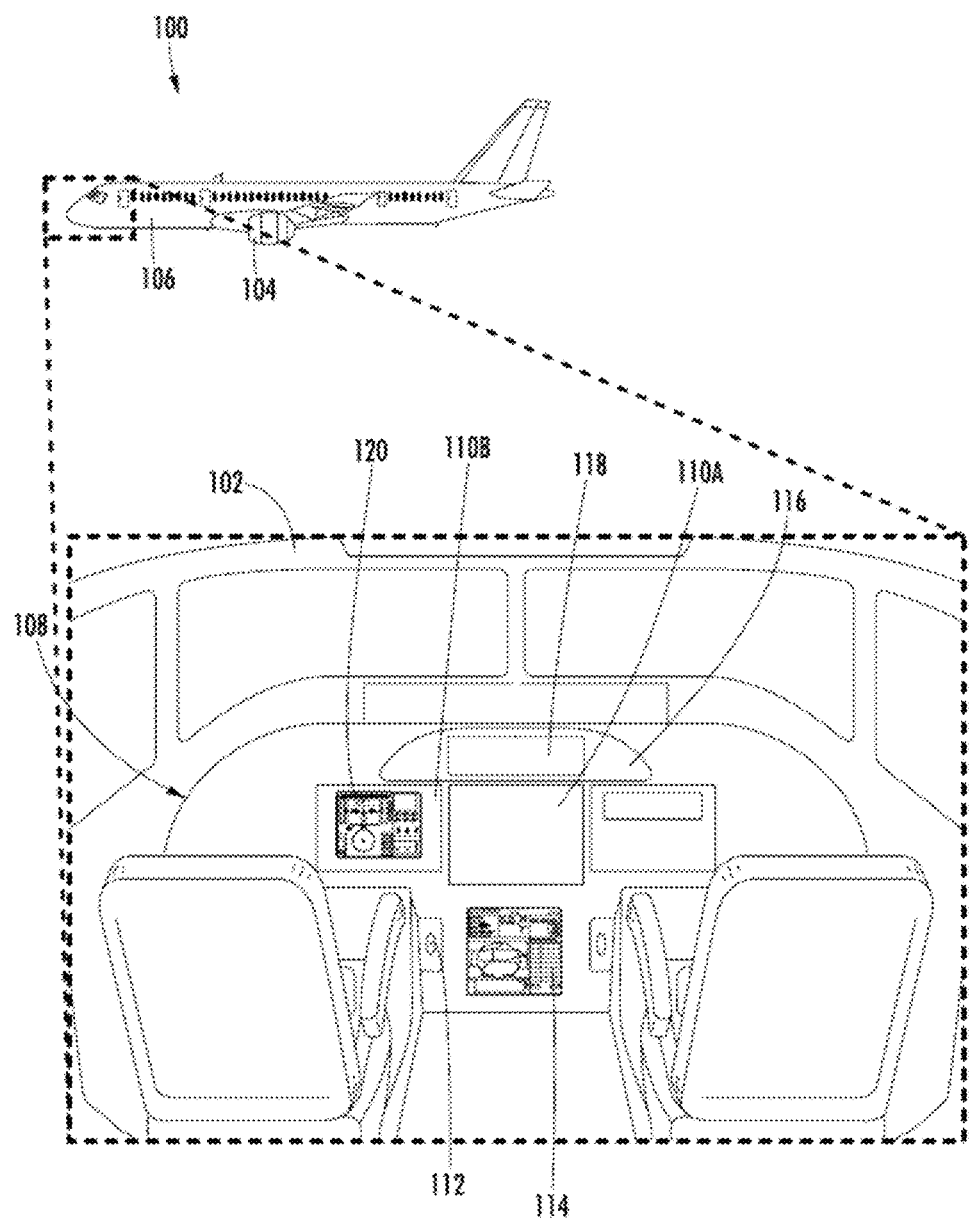
FIG. 1 depicts a perspective view of an example portion of an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can allow integration of a flight management system of an aerial vehicle with a flight director of the aerial vehicle. The flight management system of the aerial vehicle can be similar to a global positioning system in a vehicle. The flight director can control the flight of the aerial vehicle. The flight director can operate in automatic modes. The flight director can operate in manual modes.

The aerial vehicle can utilize a single interface to control both the flight management system and the flight director. In a traditional system, a pilot can intend to make adjustments to an aerial vehicle which may not take effect if the aerial vehicle is in an automatic mode. The single interface can eliminate confusion regarding whether an aerial vehicle is in an automatic mode or a manual mode by using the single interface to make adjustments during all modes.

Methods and systems according to example embodiments of the present disclosure can integrate the single interface with the flight management system. The integrated single interface and flight management system can provide the input for the flight director. For instance, if the single interface indicates a manual mode, then the flight director can receive the manual instructions from the integrated single interface and flight management system. If the single interface indicates an automatic mode, then the flight director can receive a route (e.g., flight plan, flight path, etc.) from the flight management system.

In particular implementations, the single interface can include a first input device for selecting a mode. For instance, the first input device can be an outer knob used to select a mode. The single interface can communicate with an output device to display parameters related to the mode selected. The parameter can be a parameter indicative of a flight plan. The parameter can be a numeric parameter when the selected mode uses numerical parameters. For example, the parameter can be a numeric parameter representing a degree when the selected mode uses the numeric parameter to determine at what degree the head of the aerial vehicle should be pointed. The parameter can be an alphabetic parameter when the selected mode uses alphabetic parameters. For example, the parameter can be an alphabetic parameter representing an airport code when the selected mode uses the airport code to determine a route. For example, the parameter can be an alphabetic parameter representing waypoint identifier when the selected mode uses the waypoint identifier to determine a route. The parameter can include a combination of numerical and alphabetic parameters, or any other symbols. The output device can display a numerical parameter when a manual mode is selected by the first input device and an airport code and/or waypoint identifier when an automatic mode is selected by the first input device. The single interface can include a second input device for changing a parameter associated with the mode. For instance, the second input device can be an inner knob used to change the parameter. As the parameter is changed, the output device can be updated to include the changed parameter. The single interface can include a third input device for selecting the parameter. For instance, the third input device can be a button for selecting the parameter. The parameter displayed on the output device can be sent to the flight director for controlling the aerial vehicle when the third input device is engaged. In this way, the systems and methods according to example aspects of the present disclosure have a technical effect of integrating a flight management system of an aerial vehicle with a flight director of the aerial vehicle.

FIG. 1 depicts a perspective view of an example portion of an aerial vehicle 100 according to example embodiments of the present disclosure. The aerial vehicle 100 can include, for instance, a cockpit 102, one or more engine(s) 104, and a fuselage 106. The aerial vehicle 100 can include a flight deck 108, which can include one or more display device(s) 110A-B (e.g., multifunctional flight display devices) including one or more display screens. For example, the aerial vehicle 100 can a first display device 110A and a second display device 110B. A user (e.g., a flight crew member, a pilot) can be present in the cockpit (e.g., in a seat facing the display device(s) 110A-B).

The aerial vehicle 100 can include one or more input device(s) 112 (e.g., in the cockpit 102) that can be configured to provide input to one or more system(s) of the aerial vehicle 100. The input device(s) 112 can include any device suitable to accept input from a user for interaction with the systems of the aerial vehicle 100. For example, the input device(s) 112 can include a keyboard, joystick, multi-way rocker switches, mouse, trackball, touch screen, touch pad, data entry keys, a microphone suitable for voice recognition, and/or any other suitable device. The input device(s) 112 can include an outer knob, an inner knob, and a button. In some implementations, the outer knob can be used to select a mode, such as a flight mode, inner knob can be used to cycle through parameters associated with the selected mode, and the button can be used to select a parameter associated with the mode. In some implementations, the input device(s) 112 can be configured to allow the user to interact with a graphic and/or textual data element provided for display on the display device(s) 110A-B. For example, a display device (e.g., the first display device 110A) can be used to display parameters associated with the selected mode.

The aerial vehicle can include a flight management system 114. The flight management system 114 can include one or more of the input device(s) 112. The flight management system 114 can be configured to manage the flight control of the aerial vehicle 100. For instance, the flight management system 114 can be configured to implement, manage, and/or control a flight mode, flight path, flight plan, flight trajectory, etc. for the aerial vehicle 100. For example, the flight management system 114 can include and/or determine a route associated with an airport code and/or a waypoint identifier. The flight management system 114 can be configured to receive input from a user. In some implementations, the flight management system 114 can receive user input via the one or more input device(s) 112. Additionally, and/or alternatively, the flight management system 114 can be associated with a display device (e.g., the first display device 110A) that the user can interact with and/or that can be configured to display information associated to the flight management system 114. For example, the first display device 110A can include one or more user interfaces. The first display device 110A can be operably coupled with the input devices 112 such that a user can interact with the user interface (e.g., cursor interaction via trackball, mouse, etc.) and the textual and/or graphical elements included in the user interface. Additionally, and/or alternatively, the first display device 110A can include a touch display screen that can allow a user to visualize the user interface on the touch display screen and interact with the user interface (and the flight management system 114) through the touch display screen. The flight management system 114 can be configured to implement one or more flight mode(s), flight plans, etc. of the aerial vehicle 100 selected by user input and display information associated with the one or more flight mode(s) on a display device (e.g., first display device 110A).

The aerial vehicle 100 can include a flight director 116. The flight director 116 can include one or more of the input device(s) 112. The flight director 116 can control an autopilot system. The flight director 116 can be configured to assist in the control of the trajectory of the aerial vehicle 100 with and/or without user (e.g., pilot) interaction. For instance, the flight director 116 can be configured to assist the aerial vehicle 100 to operate in various control modes. For example, the flight director 116 can be configured to assist the aerial vehicle 100 to operate in an "autonomous" control mode (e.g., no user control) and/or a "shared" control mode (e.g., some user control, some autopilot system automated control). In some implementations, the aerial vehicle 100 can operate in a "manual" control mode by which, for example, there is limited-to-no autopilot system automated control of the aerial vehicle 100. The flight director 116 can include a panel 118 that can be configured to, for example, display information related to the flight director 116 (e.g., flight paths, flight plans, routes, selected flight modes, control modes, parameters associated with selected flight modes, etc.).

In some implementations, the flight director 116 can be associated with a display device (e.g., the first display device 110A), such that the display device can display information associated with the flight director 116 (e.g., flight paths, flight plans, routes, selected flight modes, control modes, parameters associated with selected flight modes, etc.). In some implementations, the associated display device (e.g., first display device 110A) can include one or more user interface(s). For example, the first display device 110A can be operably coupled with the input devices 112 such that a user can interact with the user interface (e.g., cursor interaction via trackball, mouse, etc.) and the textual and/or graphical elements included in the user interface. Additionally, and/or alternatively, the first display device 110A can include a touch display screen that can allow a user to visualize the user interface on the touch display screen and interact with the user interface (and the flight director 116) through the touch display screen. In some implementations, the panel 118 can include the first display device 110A and/or a display device that can perform similar operations and/or functions, as described herein.

The aerial vehicle 100 can include a flight mode annunciator 120 that can be configured to inform the flight crew of a past, current, and/or future status of the aerial vehicle 100. For instance, the second display device 110B can be associated with the flight mode annunciator 120. The flight mode annunciator 120 can be configured to display (e.g., via the second display device 110B) one or more past, current, and/or future flight mode(s) associated with the aerial vehicle 100, as well as other information associated with the status of the aerial vehicle 100.

Figure 4:
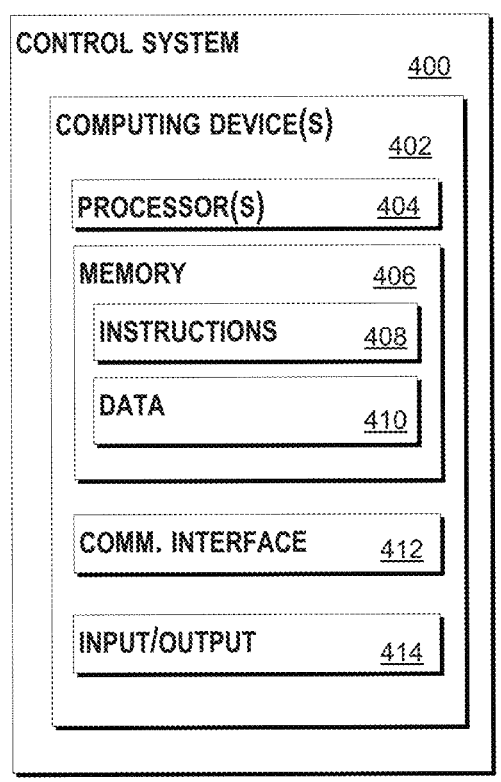
FIG. 4 depicts a computing system for implementing one or more aspects according to example embodiments of the present disclosure.

The input devices 112 in accordance with one or more embodiments of the present disclosure will be described in more detail in reference to FIGS. 2A-2D. The flight management system 114 and/or the flight director 116 can be stored in memory and executed by one or more computing device(s), as shown in FIG. 4.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

FIGS. 2A-2D depict an example interface 200. The interface 200 can include a first input device 202. The first input device can be used for selecting a mode. The first input device 202 can be an outer knob, dial, etc. Selection of the mode can include turning the first input device 202 to a corresponding mode label 204a-c. In another embodiment, a mode output device can display a mode. The mode output device can display a different mode in response to engagement of the first input device 202. The flight director can operate in a mode associated with the mode selected by the first input device 202. Example modes include automatic modes (such as the "autonomous" and "shared" modes previously discussed) and manual modes as previously discussed. Example automatic modes include Flight Plan Mode 204b, which causes a top entry in a flight plan of the flight management system to be sent to the flight director, Capture Mode, or any other automatic mode. Example manual modes include Heading Mode 204a, which can enter a top entry in the flight plan that specifies a heading of the aerial vehicle and can allow a pilot to steer the nose of the aerial vehicle, Track Mode 204c, which can allow a pilot to control the ground path of the aerial vehicle, Intercept Mode, or any other manual mode.

The interface 200 can include and/or be in communication with an output device 206 for displaying a parameter associated with the selected mode. The interface can include a second input device 208. The second input device 208 can be used to cycle through parameters associated with the selected mode. The second input device 208 can be an inner knob, dial, etc. Cycling through the parameters associated with the selected mode can include turning the second input device 208. The output device 206 can be updated with a current parameter as the second input device 208 is engaged. The interface 200 can include a third input device 210. The third input device 210 can be used to select a parameter associated with the mode shown on the output device 206. The third input device 210 can be a button. Engaging the third input device 210 can cause the parameter associated with the selected mode on the third input device 210 and an indication of the selected mode to be transmitted to the flight director. In another embodiment, the indication of the selected mode can be transmitted to the flight director in response to engagement of the first input device 202. A flight plan output device 220 can display entries in a flight plan. The entries in a flight plan can include airport codes, waypoint identifiers, etc.

Figure 2A:
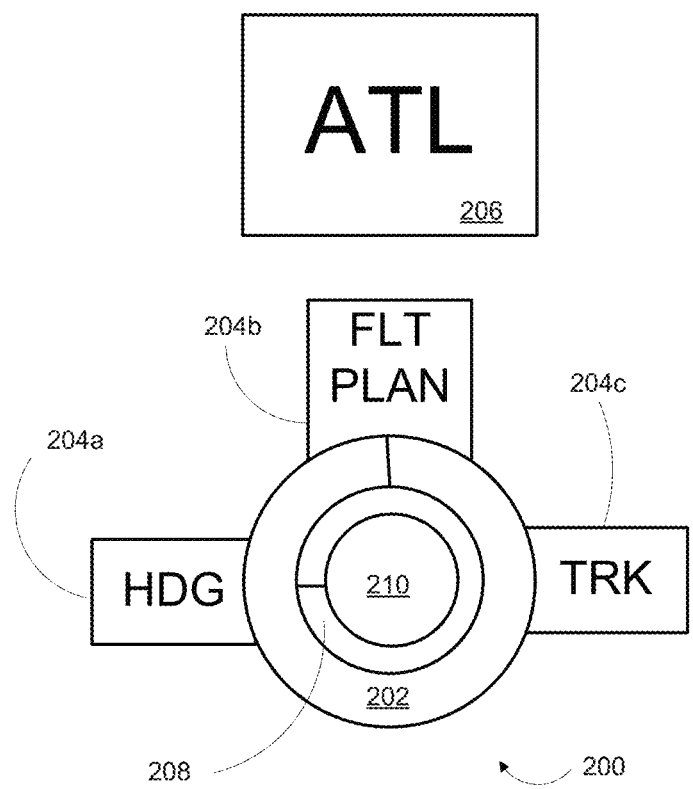
FIGS. 2A-2D depict an example interface.
Figure 2B:
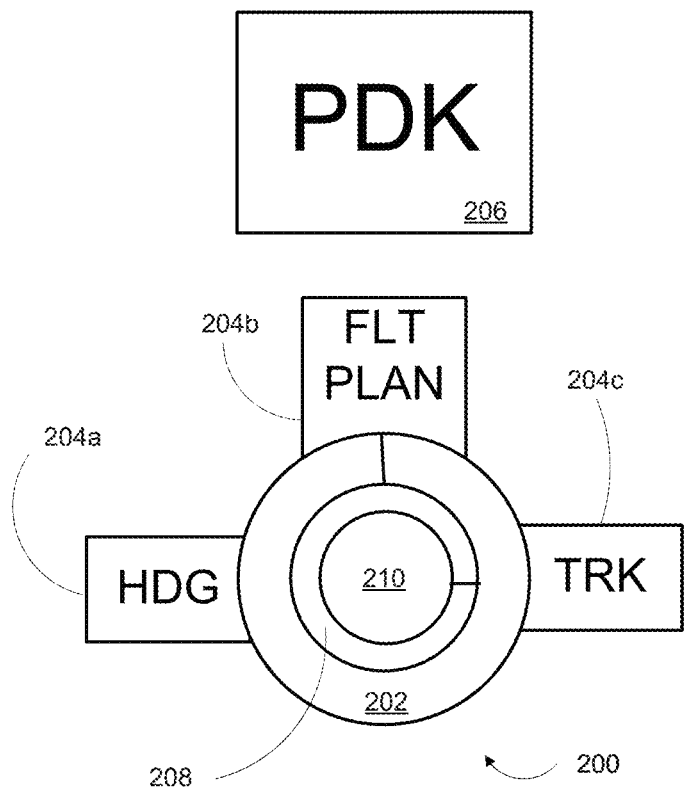
Figure 2C:
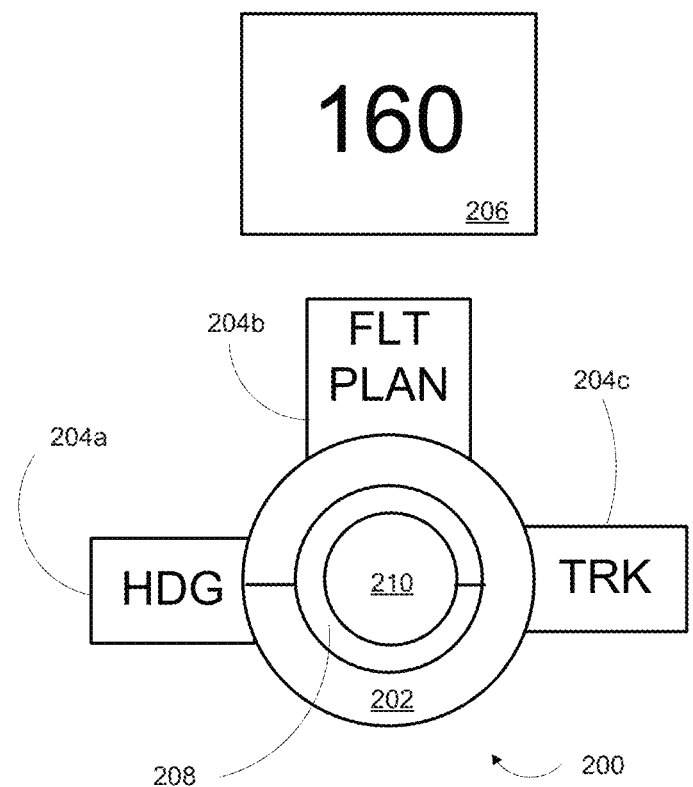
Figure 2D:
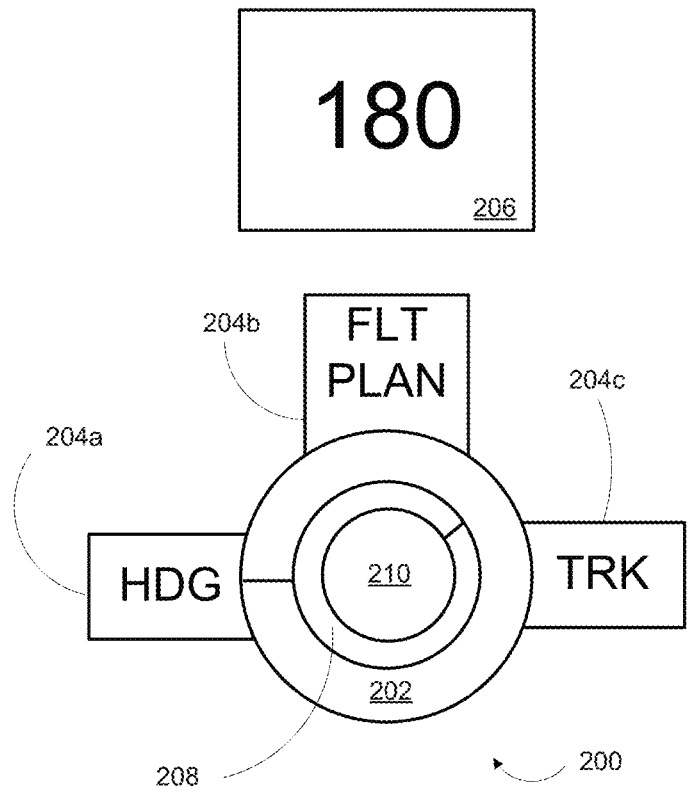

FIG. 2A depicts a first example state of the interface 200. For example, the first input device 202 can indicate that the flight director is in Flight Plan Mode 204b. The output device 206 can indicate that ATL is the next node (e.g., airport, location, landmark, etc.) in the flight plan. The flight plan output device 220 can display ATL at the top when the third input device 210 is engaged while the output device 206 displays ATL. FIG. 2B depicts a second example state of the interface 200. In the second example state of the interface 200, the second input device 208 is engaged to change the parameter shown in output device 206. The parameter is changed from ATL to PDK. In an aspect, the entries shown in the flight plan output device 220 can be shown in the output device 206 in order when the second input device 208 is engaged. For example, when the second input device 208 is turned to the right, the output device 206 can go from displaying ATL to KLOWD and then from KLOWD to BLEWW. The flight plan output device 220 can display PDK at the top when the third input device 210 is engaged while the output device 206 displays PDK. FIG. 2C depicts a third example state of the interface 200. In the third example state of the interface 200, the first input device 202 can be engaged to select Heading Mode 204a. The output device 206 is updated to show a parameter, 160, associated with the Heading Mode 204a. The flight plan output device 220 can display HDG 160 at the top when the third input device 210 is engaged while the output device 206 displays 160. FIG. 2D depicts a fourth example state of the interface 200. In the fourth example state of the interface 200, the second input device 208 is engaged to change the parameter shown in output device 206. The parameter is changed from 160 to 180. The flight plan output device 220 can display HDG 180 at the top when the third input device 210 is engaged while the output device 206 displays 180.

Figure 3:
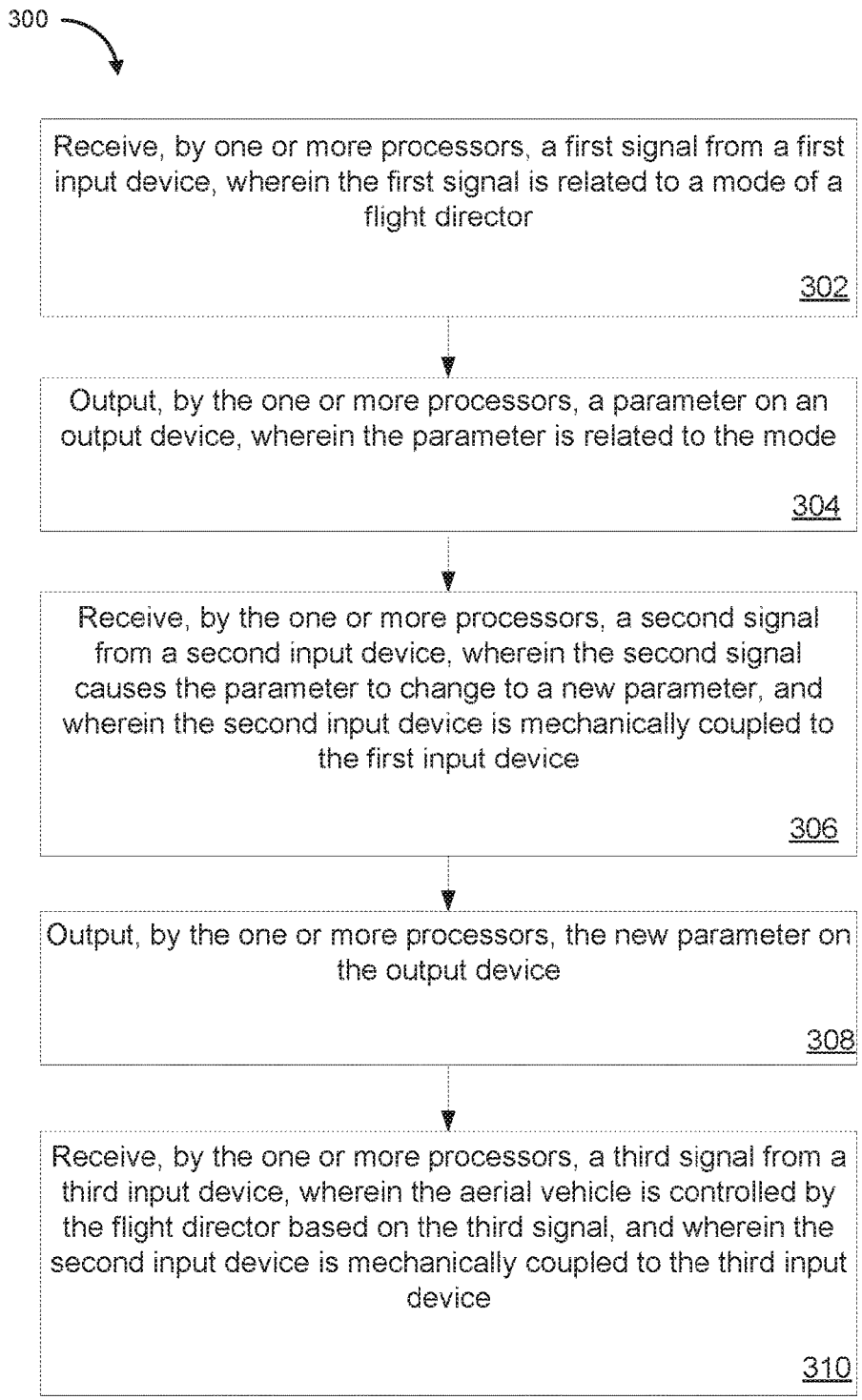
FIG. 3 depicts a flow diagram of an example method according to example embodiments of the present disclosure.

FIG. 3 depicts a flow diagram of an example method (300) for controlling an aerial vehicle according to example embodiments of the present disclosure. The method 300 can be performed by a flight management system. At (302), a first signal can be received from a first input device. The first signal can be related to a mode of a flight director. The mode can be an automatic mode, such as an autonomous mode and/or a shared mode. Examples of an automatic mode can be the Flight Plan Mode 204*b* and/or Capture Mode. The mode can be a manual mode. Examples of a manual mode can be the Heading Mode 204*a* the Tracking Mode 204*c*, and/or Intercept Mode. The first input device can be an outer knob, dial, etc. The first signal can be received in response to a turn of the outer knob.

At (304), a parameter related to the mode can be outputted on an output device. The parameter can be a numeric parameter when the selected mode uses numerical parameters. For example, the parameter can be a numeric parameter representing a degree when the selected mode uses the numeric parameter to determine at what degree heading the nose of the aerial vehicle should be pointed. The parameter can be an alphabetic parameter when the selected mode uses alphabetic parameters. For example, the parameter can be an alphabetic parameter representing an airport code when the selected mode uses the airport code to determine a route. For example, the parameter can be an alphabetic parameter representing waypoint identifier when the selected mode uses the waypoint identifier to determine a route. The parameter can include a combination of numerical and alphabetic parameters, or any other symbols.

At (306), a second signal can be received from a second input device. The second signal can cause the parameter to change to a new parameter. The second input device can be mechanically coupled to the first input device. The second input device can be an inner knob, dial, etc. The second signal can be received in response to a turn of the inner knob. The first input device can surround the second input device. An outer circumference of the second input device can be in communication with an inner circumference of the first input device. The second input device can be on top of the first input device. At (308), the new parameter can be outputted on the output device.

At (310), a third signal can be received from a third input device. The aerial vehicle can be controlled by the flight director based on the third signal. The second input device can be mechanically coupled to the third input device. The third input device can be a button. The third signal is received in response to a press of the button. The second input device can surround the third input device. An outer circumference of the third input device can be in communication with an inner circumference of the second input device. The third input device can be on top of the second input device. Output of the flight management system can be input to the flight director. Input to the flight director can be output from the flight management system. In an aspect, the methods and systems described herein can eliminate direct user interaction with the flight director. In an embodiment, the new parameter can be entered as a top entry in a flight plan in response to the third signal. For example, if the new parameter is an entry in the flight plan, then the new parameter can be moved to the top of the flight plan. As another example, if the new parameter is a heading setting, then the heading of the aerial vehicle as specified by the new parameter can be entered as a top entry in the flight plan in response to the third signal. In an embodiment, input into the flight director can be the top entry in the flight plan.

FIG. 4 depicts a block diagram of an example computing system that can be used to implement a control system 400 or other systems of the aerial vehicle according to example embodiments of the present disclosure. In an embodiment, the control system 400 can be in communication with the flight management system 114 and/or the flight director 116. In an embodiment, the control system 400 can be integrated with the flight management system 114 and/or the flight director 116. As shown, the control system 400 can include one or more computing device(s) 402. The one or more computing device(s) 402 can include one or more processor(s) 404 and one or more memory device(s) 406. The one or more processor(s) 404 can include any suitable processing device, such as a microprocessor, microcontroller, integrated circuit, logic device, or other suitable processing device. The one or more memory device(s) 406 can include one or more computer-readable media, including, but not limited to, non-transitory computer-readable media, RAM, ROM, hard drives, flash drives, or other memory devices.

The one or more memory device(s) 406 can store information accessible by the one or more processor(s) 404, including computer-readable instructions 408 that can be executed by the one or more processor(s) 404. The instructions 408 can be any set of instructions that when executed by the one or more processor(s) 404, cause the one or more processor(s) 404 to perform operations. The instructions 408 can be software written in any suitable programming language or can be implemented in hardware. In some embodiments, the instructions 408 can be executed by the one or more processor(s) 404 to cause the one or more processor(s) 404 to perform operations, such as the operations for integrating the flight management system with the flight director, as described with reference to FIG. 3, and/or any other operations or functions of the one or more computing device(s) 402.

The memory device(s) 406 can further store data 410 that can be accessed by the processors 404. For example, the data 410 can include a navigational database, data associated with the navigation system(s), data associated with the control mechanisms, data indicative of a flight plan associated with the vehicle 100, data associated with flight director mode selection, data associated with a flight management system, and/or any other data associated with vehicle 100, as described herein. The data 410 can include one or more table(s), function(s), algorithm(s), model(s), equation(s), etc. for navigating the vehicle 100 according to example embodiments of the present disclosure.

The one or more computing device(s) 402 can also include a communication interface 412 used to communicate, for example, with the other components of system. The communication interface 412 can include any suitable components for interfacing with one or more network(s), including for example, transmitters, receivers, ports, controllers, antennas, or other suitable components.

The one or more computing device(s) 402 can include input and/or output devices 414. For example, the input and/or output device(s) 414 can include a keyboard, joystick, multi-way rocker switches, mouse, trackball, touch screen, touch pad, data entry keys, a microphone suitable for voice recognition, a display device and/or any other suitable device. The input and/or output device(s) 414 can include the interface 200 of FIGS. 2A-2D.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an aerial vehicle comprising:
receiving, by one or more processors, a first signal from a first input device, wherein the first signal is related to a mode of a flight director;
outputting, by the one or more processors, a parameter on an output device,
wherein the parameter is related to the mode;
receiving, by the one or more processors, a second signal from a second input device, wherein the second signal causes the parameter to change to a new parameter, and wherein the second input device is mechanically coupled to the first input device;
outputting, by the one or more processors, the new parameter on the output device; and
receiving, by the one or more processors, a third signal from a third input device, wherein the aerial vehicle is controlled by the flight director based on the third signal, and wherein the second input device is mechanically coupled to the third input device;
wherein (i) the first input device is an outer knob, (ii) the second input device is an inner knob, the first input device surrounding the second input device, and (iii) the third input device is a button, the second input device surrounding the third input device.

2. The method of claim 1, wherein the first signal is received in response to a turn of the outer knob.

3. The method of claim 1, wherein the second signal is received in response to a turn of the inner knob.

4. The method of claim 1, wherein the third signal is received in response to a press of the button.

5. The method of claim 1, wherein a top entry in a flight plan is input into the flight director.

6. The method of claim 1, wherein a heading of the aerial vehicle is entered as a top entry in a flight plan in response to the third signal.

7. The method of claim 1, wherein the method is performed by a flight management system.

8. A system for controlling an aerial vehicle, the system comprising: a flight director that controls the aerial vehicle;
a first input device that specifies one or more modes of the flight director;
a second input device that specifies one or more parameters related to the one or more modes, wherein the second input device is mechanically coupled to the first input device;
a third input device that confirms the one or more parameters, wherein the second input device is mechanically coupled to the third input device;
an output device that displays the one or more parameters;
one or more processors configured to:
transmit a signal to the flight director based on an engagement of the third input device, wherein the signal comprises the one or more parameters based on the second input device, and wherein the signal updates the flight director;
wherein (i) the first input device is an outer knob, (ii) the second input device is an inner knob, the first input device surrounding the second input device, and (iii) the third input device is a button, the second input device surrounding the third input device.

9. The system of claim 8, wherein the mode is an automatic mode.

10. The system of claim 8, wherein the mode is a manual mode.

11. The system of claim 8, wherein a flight management system comprises the one or more processors.

12. An aerial vehicle comprising:
a flight director that controls the aerial vehicle;
a first input device that specifies one or more modes of the flight director;
a second input device that specifies one or more parameters related to the one or more modes, wherein the second input device is mechanically coupled to the first input device;
a third input device that confirms the one or more parameters, wherein the second input device is mechanically coupled to the third input device;
an output device that displays the one or more parameters;
a flight management system comprising one or more processors configured to:
transmit a signal to the flight director based on an engagement of the third input device, wherein the signal comprises the one or more parameters based on the second input device, and wherein the signal updates the flight director;
wherein output of the flight management system is input to the flight director.

13. The aerial vehicle of claim 12, wherein input to the flight director is output from the flight management system.

14. A single user interface for controlling an aerial vehicle, comprising:
a first input device for selecting a mode for controlling the aerial vehicle in accordance with a flight management system;
an output device for displaying a parameter associated with the selected mode;
a second input device operably dependent upon settings of the first input device and configured for changing the displayed parameter, the output device being updated to display the changed parameter; and
a third input device operably dependent upon settings of the second input device and configured for (i) selecting the changed parameter and (ii) providing the changed parameter to a flight director for assisting the control of the aerial vehicle.

15. A method for controlling an aerial vehicle via a single user interface, comprising:
selecting, via a first input device of the interface, a mode for controlling the aerial vehicle in accordance with a flight management system;
displaying, via an output device, a parameter associated with the selected mode;
changing the displayed parameter via a second input device of the interface operably dependent upon settings of the first input device;
updating the output device to display the changed parameter;
selecting the changed parameter, via a third input device of the interface operably dependent upon settings of the second input device; and providing the changed parameter to a flight director for assisting the control of the aerial vehicle.

\* \* \* \* \*